United States Patent [19]

Izawa et al.

[11] 4,062,665
[45] Dec. 13, 1977

[54] CONTINUOUS OPTICAL FIBER PREFORM FABRICATION METHOD

[75] Inventors: Tatsuo Izawa; Tadashi Miyashita, both of Mito; Fumiaki Hanawa, Kitaibaraki, all of Japan

[73] Assignee: Nippon Telegraph and Telephone Public Corporation, Tokyo, Japan

[21] Appl. No.: 784,869

[22] Filed: Apr. 5, 1977

[30] Foreign Application Priority Data

Apr. 6, 1976   Japan .................................. 51-38883

[51] Int. Cl.² ............................................ C03B 37/00
[52] U.S. Cl. ........................................ 65/3 A; 65/2;
65/13; 65/18; 65/DIG. 7
[58] Field of Search ........... 65/2, 3 A, 18, 13, DIG. 7

[56] References Cited

U.S. PATENT DOCUMENTS

| 3,823,995 | 7/1974 | Carpenter ......................... 65/3 A X |
| 3,957,474 | 5/1976 | Kobayashi ............................. 65/3 A |
| 4,017,288 | 4/1977 | French ............................. 65/3 A X |

*Primary Examiner*—Robert L. Lindsay, Jr.
*Attorney, Agent, or Firm*—Sughrue, Rothwell, Mion, Zinn and Macpeak

[57] ABSTRACT

A refractory starting member is rotated and, at the same time, moved along the axis of rotation. A glass raw material for the formation of the core of a porous preform and consequently an optical fiber preform is introduced into a high temperature portion near the tip of a high temperature burner from a nozzle for the core disposed in alignment with the center of rotation of one end face of the starting member. The glass raw material blown out from the nozzle for the core are caused by the flames of the high temperature burner to react to produce glass fine particles, which are deposited on abovesaid end face of the starting member at the central portion thereof in its axial direction to form a porous core. At least one nozzle for spraying a glass raw material for the formation of the cladding of the optical fiber preform is disposed opposite to the end face of the starting member but a little deviated from the axis of rotation thereof, or disposed opposite to the peripheral surface of the porous core. The glass raw material for the cladding is sprayed from the nozzle for the cladding to the high temperature portion of the high temperature burner, and caused to react to form glass fine particles, which are deposited on the end face of the starting member on the outside of the porous core or on the peripheral surface thereof at the same time as the formation of the latter, forming a porous cladding. The porous preform thus obtained is moved into a high temperature furnace provided on the path of movement of the preform for the vitrification thereof into an optical fiber preform.

14 Claims, 12 Drawing Figures

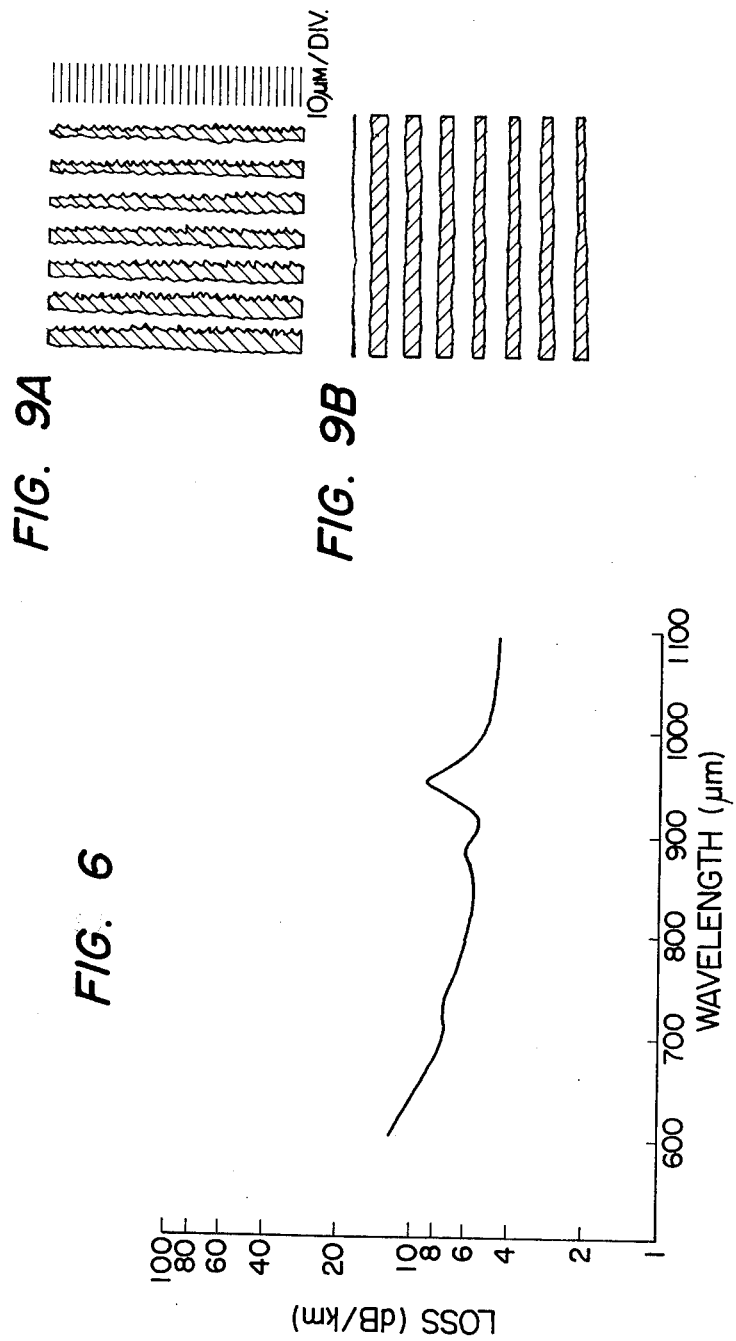

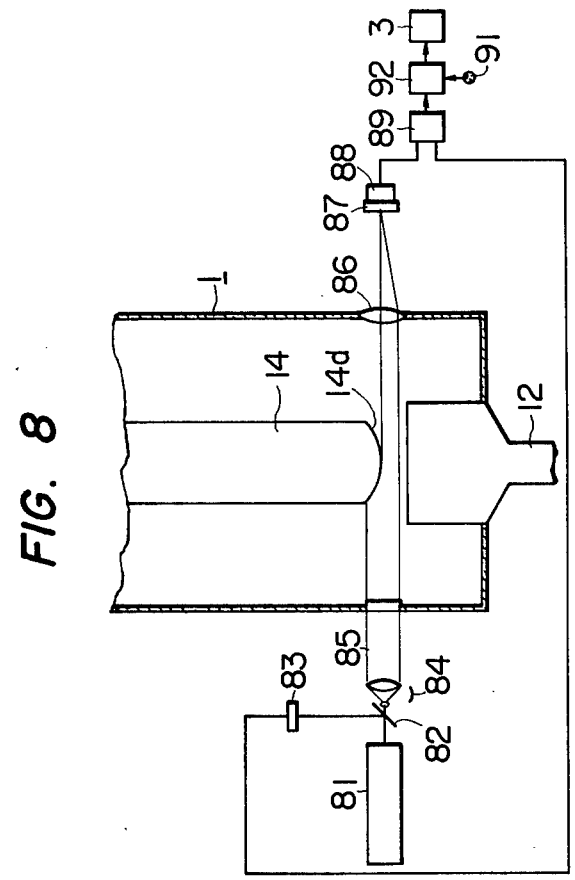
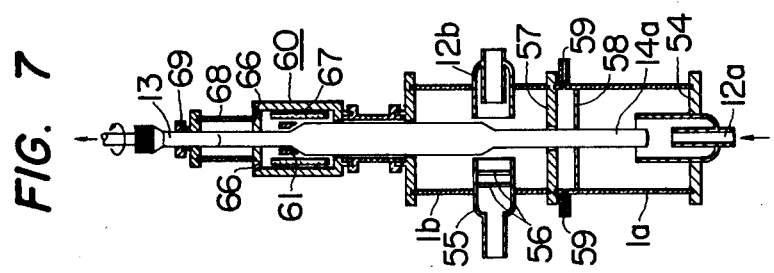

CONTINUOUS OPTICAL FIBER PREFORM FABRICATION METHOD

BACKGROUND OF THE INVENTION

This invention relates to a method of making an optical fiber preform for obtaining an optical fiber which is employed as a transmission line of optical communication, and more particularly to a method for the continuous fabrication of such an optical fiber preform.

The transmission line for use in optical communication is called optical fiber in this specification. This transmission line is a thread-like member usually made of transparent glass. For obtaining this, a large glass rod is prepared which is similar in sectional structure to the optical fiber, and is drawn out thin into the optical fiber. The glass rod is referred to as an optical fiber preform in this specification.

Since the optical fiber transmits an optical signal over a distance as long as several kilometers or more, sufficient care should be taken of its fabrication and quality. In an ordinary optical fiber, most of light is transmitted in the central core of the optical fiber which is high in refractive index, and a very small amount of light is transmitted in the peripheral cladding whose refractive index is lower than the core. The larger the refractive index difference between the core and the cladding is, the more the light confinement effect is produced, and the quantity of light escaping due to bending of the fiber is small. However, as the refractive index difference increases, the velocity difference also increases between the light transmitted mainly in the core and the light in the cladding, and the light pulse applied to one end of the optical fiber expands during transmission, so that high bit-rate optical pulse signal transmission is difficult. In other words, the band width of the base-band signal which can be transmitted over the optical fiber becomes narrow. In terms of physics, the light transmitted in the optical fiber is expressed by modes corresponding to electromagnetic properties, that is, the propagation constant and the electromagnetic field profile, and since the lights of the respective modes are transmitted at different velocities, expansion of the pulse width is resulted.

Two solutions to this problem are known in the art. One method is to change the structure of the optical fiber so that the lights of the respective modes are transmitted at the same velocity. An concrete structure thereof is disclosed in detail in U.S. Pat. No. 3,614,197 issued to Nishizawa et al and "An Optical Waveguide with the Optimum Distribution of the Refractive Index with Reference to Waveform Distribution" by Shojiro Kawakami and Junichi Nishizawa, IEEE Transactions on Microwave Theory and Techniques, Vol. MTT16, No. 10, pp. 814–818, October 1968. That is, the refractive index profile in the section of the optical fiber is selected so that the refractive index decreases from the center of the optical fiber in the radial direction substantially followed the function, as given by the following equation:

$$n_{(r)} = n_0^2 [1 - (r/R)^2 + \delta(r/R)^4 + \ldots]$$

where $\delta$ is a constant from $\frac{2}{3}$ to 1, $n_0$ the refractive index of the center of the optical fiber and R the radius of the optical fiber.

With the transmission mode of the optical fiber having such a refractive index profile, since the transmission velocities of the respective modes are substantially the same, expansion of the light pulse is very little. The optical fiber of such a structure is called graded index type optical fiber.

The other method is to reduce the velocity dispersion by decreasing the number of transmission modes. The simplest form of this structure is that transmission takes place only in a single mode.

The requirements for transmission only in a single mode are set forth in "Fiber Optics-Principles and Applications" by N. S. Kapany, Academic Press (1967). The optical fiber is needed to have the structure satisfying the following conditions:

$$R = 2\pi a/\lambda \sqrt{n_1^2 - n_2^2}$$

where $a$ is the radius of the core, the wavelength of light transmitted, $n_1$ the refractive index of the core, and $n_2$ the refractive index of the cladding. Where the value of R is smaller than 2.405, only one mode is transmitted, so that pulse broadening is very little. The optical fiber produced by this method has an abrupt refractive index change at the boundary between the central portion of high refractive index and the cladding portion of lower refractive index, and this type of optical fiber is referred to as the step index type optical fiber.

As described above, whether the graded index type or step index type, the optical fiber is required to have the structure of the desired type. To this end, it is necessary to produce a optical fiber preform which exactly complies with the structural requirements of the optical fiber desired to obtain.

Conventional methods for the manufacture of optical fiber preforms are set forth in U.S. Pat. No. 3,737,292 issued to D. B, Keck et al and U.S. Pat. No. 3,823,995 issued to L. L. Carpenter et al. With the prior art methods, a substantially cylindrical starting member is prepared and glass fine particles produced as by flame-hydrolysis of glass raw materials are deposited in layers on the entire area of the peripheral surface of the starting member. Then, the deposited layers of the glass fine particles are vitrified in a high temperature furnace, after which the starting member is removed, and only the deposited layers of the glass to form a preform having a solid cross-sectional area are by heating to collapse the hollow portion. In this case, if the components of the abovesaid layers are each selected to be a little different from the component of the immediately inside layer, the graded index type optical fiber preform can be obtained. On the other hand, where a plurality of layers of a constant thickness for the core of high refractive index are deposited on the starting member and a plurality of layers for the cladding of lower refractive index are deposited on the core, the step index type optical fiber preform can be obtained. In other words, the layers are deposited on the starting member one by one, with the concentration of a dopant for controlling the refractive index of each layer changed.

The above method has a defect that such a porous deposit of glass fine particles formed on a solid starting member is likely to be cracked as by small temperature variations because of the thermal expansion coefficient difference and density difference between the starting member and the deposit. With this method, however, fabrication of large optical fiber preforms is easier than the other conventional methods such for example, as set forth in U.S. Pat. No. 3,737,293 issued to R. D. Maurer.

With the method of R. D. Maurer, a quartz tube is prepared, a plurality of glass layers of low refractive index are deposited on the interior surface of the quartz tube and then a plurality of glass layers of high refractive index are deposited on the low refractive index layers and finally the composit structure are collapse to achieve a solid cross-sectional structure to the center. This method has a defect of difficulty in the fabrication of large optical fiber preforms.

One object of this invention is to provide a continuous optical fiber preform fabrication method with which it is possible to obtain an optical fiber preform of desired characteristics easily and continuously, even if it is large and long.

Another object of this invention is to provide a continuous optical fiber preform fabrication method which is high in productivity.

Another object of this invention is to provide a continuous optical fiber preform fabrication method with which it is possible to obtain an excellent optical fiber preform which is formed of a deposit of glass fine particles to the core and which is free from alient substances such as a starting material and so on, stable thermally and mechanically and difficult of cracking.

Still another object of this invention is to provide a continuous optical fiber preform fabrication method which does not require removal of a starting member and is simple in manufacturing steps.

SUMMARY OF THE INVENTION

In accordance with this invention, glass fine particles having a spatial composition profile are deposited on a starting member in its lengthwise direction unlike in the conventional method of changing the composition of glass fine particles to be deposited in terms of time, by which an optical fiber preform is continuously produced. That is, a refractory starting member is rotated and, at the same time, moved along the axis of rotation. A glass raw material for the formation of the core of the preform is blown off from a nozzle disposed opposite to the center of rotation of one end face of the starting member. The glass raw material is caused to react in a high temperature portion near the tip of a high temperature burner to produce glass fine particles consisting principally of silicon dioxide. The glass fine particles are deposited on the central portion of one end face of the starting member in its axial direction to form a porous core. At least one nozzle, for spraying a glass raw material for the formation of the cladding of the preform, is disposed, for example, opposite to the end face of the starting member but a little deviated laterally from the center of rotation. The glass raw material blown off from this nozzle is directed to the high temperature portion for reaction to form glass fine particles consisting principally of silicon dioxide. The glass fine particles thus formed are deposited on the end face of the starting material in its axial direction on the outside of the porous core, thereby forming a porous cladding. Alternatively, the nozzle for the cladding is disposed adjacent to the peripheral surface of the moving porous core to deposit the glass fine particles from the nozzle on the peripheral surface of the porous core to form thereon a porous cladding. The porous preform composed of the core and the cladding formed thereon, thus obtained, is supplied to a high temperature furnace disposed in the direction of movement of the starting member for vitrification into a transparent optical fiber preform. In this manner, the optical fiber preform is continuously obtained. Where a plurality of nozzles for cladding are disposed opposite to the end face of the starting member, these nozzles are disposed symmetrically with respect to the nozzle for the core and each pair of nozzles symmetrical with respect to the nozzle for the core are supplied with a glass raw material of the same components. The glass raw materials fed to these nozzles are selected so that the refractive index of the resulting glass becomes lower as the outermost nozzle is approached from the nozzle for the core. The nozzle for the core and the nozzles for the cladding may be mounted in different high temperature burners, but may also be incorporated in one common high temperature burner. Where a plurality of nozzles for the cladding are positioned oppposite to the peripheral surface of the porous core, they are supplied with glass raw materials selected so that the refractive index of the resulting glass decreases as the high temperature furnace is approached. These nozzles may be provided in one common high temperature burner, or in separate high temperature burners. It is also possible to dispose one of the nozzles for the cladding opposite to the end face of the starting member and the other opposite to the peripheral surface of the porous core. In this case, the glass raw material supplied to the latter nozzle is selected such that the refractive index of the resulting glass is lower than that obtained with the glass raw material fed to the former nozzle. The diameter of the porous core can be made constant by a cutting tool disposed in contact with the peripheral surface of the porous core. By flowing off an inert gas from the marginal edge of the high temperature burner in layers in the direction of the axis of rotation, the glass fine particles can be efficiently deposited on the end face of the starting member without divergence. Further, the position of the growing end face of the porous preform is detected to obtain a detected positional output signal, by which the moving speed of the starting member is controlled to maintain the growing end face at a constant position.

BRIEF DESCRIPTION OF THE DRAWINGS

FIG. 6 is a graph showing the frequency loss characteristic of the optical fiber preform;

FIG. 7 is a sectional diagram illustrating another example of the apparatus for use in the continuous optical fiber preform fabrication method of this invention;

FIG. 8 is a schematic diagram showing an example of means for controlling the porous preform growing end face to retain it at a constant position; and FIGS. 9A and 9B show interference fringes of refractive fluctuations of the optical fiber preform, measured by an interference microscope.

DESCRIPTION OF THE PREFERRED EMBODIMENTS

Figure 1:
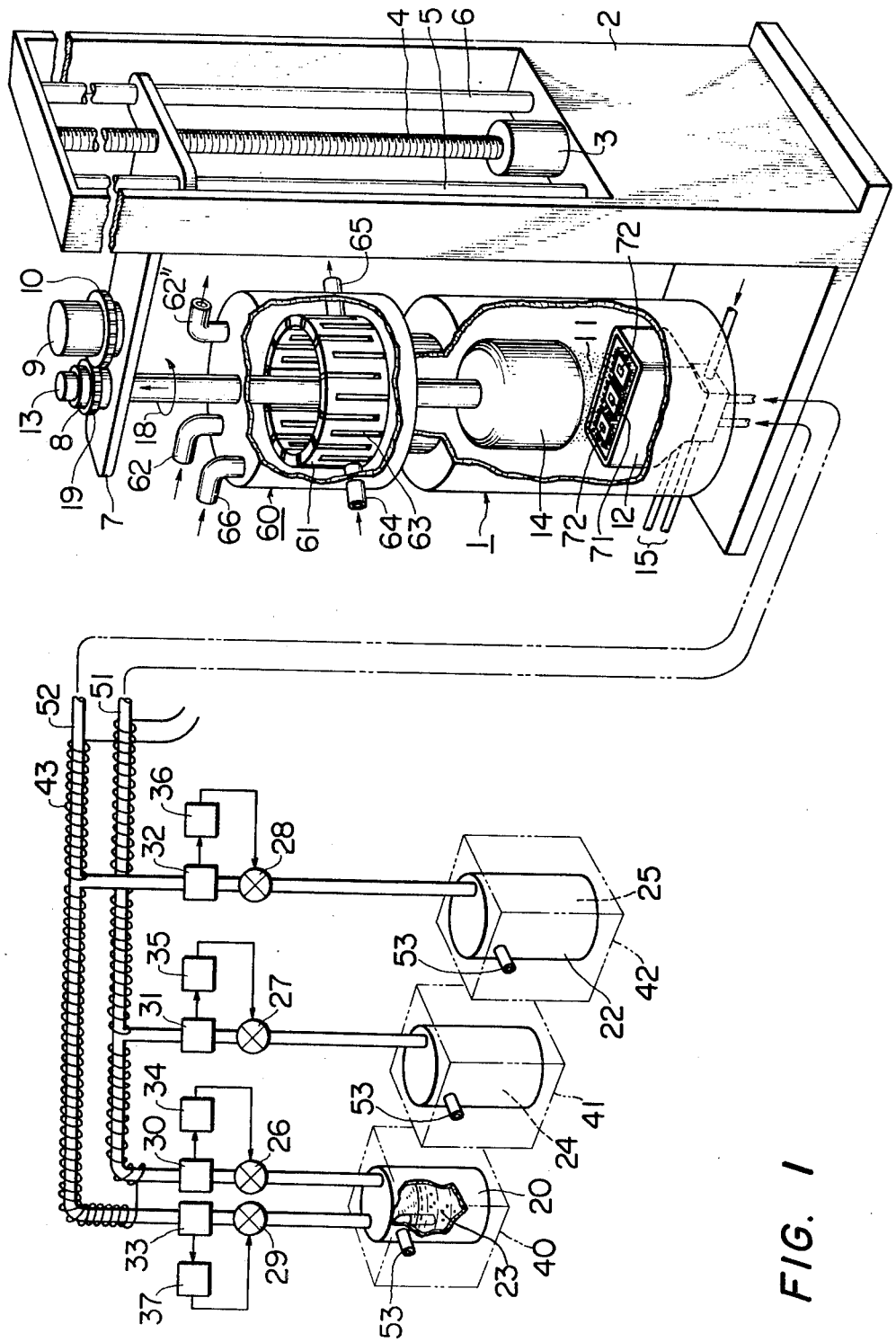
FIG. 1 is a schematic diagram illustrating an apparatus for use in the practice of the continuous optical fiber preform fabrication method according to this invention.

As illustrated in FIG. 1, a gas-tight vessel 1 composed of a cylindrical vessel as of hard glass and anti-corrosive paint coated stainless steel plates covering both ends of the cylindrical vessel, glass fine particles 11 are formed by a high temperature portion of a flame-hydrolysis burner 12, and deposited in the form of a rod on one end face of a refractory starting member or mandrel 13 positioned near the burner 12, thus providing a porous preform 14. From supply sources (not shown), an oxygen gas and a hydrogen gas or a combastible gas are supplied to the burner 12 through suitable means such as pipes 15. The mixture is burned by the burner 12 to produce a glass synthesize reaction in glass raw materials sprayed into the flames.

In containers 20, 21 and 22, there are contained predetermined amounts of liquid compositions 23, 24 and 25, respectively which will ultimately form the porous preform 14. The liquid compositions 23 to 25 are supplied in the form of vapor by their own vapor pressures from the containers 20 to 22 to the burner 12 through control valves 26 to 29 and flow meters 30 to 33, respectively. The flow rate values obtained from the flow meters 30 to 33 are supplied to control circuits 34 to 37, respectively, and fed back to valve drive motors to control the control valves 26 to 29 corresponding thereto, thus ensuring inflow of constant amounts of raw materials into the burner 12 at all times. Where the flow quantity of the liquid composition is small, it is also possible to supply a suitable gaseous medium, such, for instance as argon, hydrogen or oxygen gas into the container through a pipe 53 to carry out and send the vapor of the liquid composition with the abovesaid gas to the burner 12.

The containers 20 to 22 are respectively housed in constant temperature baths 40 to 42 to maintain the liquid compositions 23 to 25 desired temperaturers, respectively, holding their vapor pressures constant. Where the desired temperatures of the liquid compositions are higher than room temperature, the supply pipes to the burner 12 are heated by heaters 43 to maintain them above the temperaturers of the liquid compositions to prevent condensation of their vapor.

The liquid composition 23 contained in the container 20 is a material which will ultimately form $SiO_2$ which is the principal component of the porous preform, and the liquid compositions 24 and 25 in the containers 21 and 22 are such materials which will ultimately increase and decrease relatively the refractive index of the porous preform. The mixed vapor of the liquid compositions 23 and 24 is fed to the burner 12 through a pipe 51, and blown out into the flames of the burner 12 from its centrally disposed nozzle 71 which is provided for the formation of the core of the porous preform 14. Similarly, the mixed vapor of the liquid compositions 23 and 25 is fed to the burner 12 through a pipe 52, and sprayed into the flames of the burner 12 from its nozzles 72 which are provided on the both sides of the nozzle 71 for the formation of the cladding of the porous preform 14. The mixed vapor thus blown out into the flames of the burner 12 is hydrolyzed thereby to form the glass fine particles 11. The nozzle 71 is disposed opposite to the center of the end face of the starting member 13. The resulting stream of the glass fine particles 11 is directed to one end face of the starting member 13.

The starting member 13 is moved in its axial direction while being rotated about its axis. For example, adjacent the gas-tight vessel 1, a support frame 2 is provided which stands in parallel to the vessel 1. The support frame 2 has a motor 3 fixedly mounted on its lower end at the center thereof, and a threaded shaft 4 coupled with the rotary shaft of the motor 3. In parallel to the threaded shaft 4, a pair of guide rods 5 and 6 are fixed to the support frame 2 on both sides of the threaded shaft 4. The threaded shaft 4 is screwed into a threaded hole formed in one end portion of a support plate 7 and the guide rods 5 and 6 are respectively inserted into holes formed in the support plate 7. The starting member 13 extends upwardly through a hole in the support plate 7. On the support plate 7, a chuck 8 is secured around the starting member 13 and the chuck 8 is caught on the support plate 7, so that the starting member 13 is raised with the upward movement of the support plate 7. On the support plate 7, a motor 9 is fixedly mounted and a gear 10 affixed to the rotary shaft of the motor 9 meshes with a gear 19 formed on the peripheral surface of the chuck 8 to rotate the starting member 13 as indicated by the arrow 18.

With such an arrangement, the glass fine particles 11 are deposited uniformly on the end face of the starting member 13 in its axial direction to provide the porous preform 14 in the form of a rod. The porous preform 14 has in its radial direction the distribution of composition following the distribution of the glass raw materials blown out from the nozzles 71 and 72 of the burner 12. The movement of the starting member 13 in its axial direction is to obtain a porous preform which is uniform in its lengthwise direction. The starting member 13 is moved upwards at such a speed that the burner 12 and the growing surface of the porous preform 14 are always held at a constant distance from each other, in other words, at the same speed as the growing speed of the porous preform 14. The starting member 13 may be such, for example, as a quartz rod about 15 mm in diameter, or a member having a support rod attached to the center of a quartz disk about 20 to 50 mm in diameter.

With the upward movement of the starting member 13, the porous preform 14 thus produced is moved into a high temperature furnace 60 provided about the axis of rotation of the starting member 14. In the high temperature furnace 60, the porous preform 14 is heated, for example, up to about 1600° C locally over a length substantially equal to or a little shorter than the diameter of the preform 14, and fused thereby to be vitrified into a transparent optical fiber preform. During the vitrification, bubbles contained in the porous preform 14 are completely carried out therefrom. If the high temperature zone is too long, the removal of bubbles does not completely take place, and if too short, the preform cannot be made transparent to the center thereof.

Where glass fine particles composed of three or more components is desired, a required number of containers for such components can be provided in addition to the containers 23 to 25. This is effective for controlling not only the refractive index profile but also the thermal expansion coefficient of the optical fiber preform in its radial direction, that is, for preventing cracking in the preform by raising the refractive index in the central portion of the preform and simultaneously providing a uniform thermal expansion coefficient throughout the preform.

The high temperature furnace 60 comprises a cylindrical metallic vessel and a cylindrical carbon heater 6 disposed inside of the vessel coaxially therewith. The metallic vessel is, for instance, about 200 mm in diameter and 250 mm in length. In order to prevent the metallic vessel from being heated by the heater 61, a cooling water is supplied to the metallic vessel through a pipe 62, and drained out from a pipe 62'. The carbon heater 61 has an inner diameter of 65 mm and an outer diameter of 71 mm, and has formed therein slits 63 in the form of teeth of a comb which extend upwardly and downwardly in parallel to the axis of the heater to lie between adjacent ones of the slits of the opposite direction, thereby regulating the electric resistance value of the heater 61. Heat generating regions of the heater 61 are each defined between adjacent ones of the slits extending in opposite direction, and the confronting length of adjacent list is 30 mm. The gap between the peripheral surface of the carbon heater 61 and the metallic vessel is stuffed with carbon wool (fiber carbon) so as to provide for enhanced thermal insulating effect. When a current of 20 V and 150 A was applied from a terminal 64 at one end on the diameter of the carbon heater 61 to a terminal 65 at the other end, a high temperature of 1600° C was obtained. For avoiding oxidation of carbon, an inert gas such as nitrogen, argon, hellium or the like is supplied into the metallic vessel through a pipe 66 at a flow rate of 3 liters per minute to prevent air from flowing in the metallic vessel. It is also possible to make the inside of the furnace vacuum instead of supplying the inert gas. The high temperature described above is merely an example of heating means employed in the practice of this invention, and should not be construed as limiting the invention specifically thereto.

An example of the burner 12 basically has two nozzles, and is constructed to blow out therefrom two kinds of mixed gases.

Figure 2A:
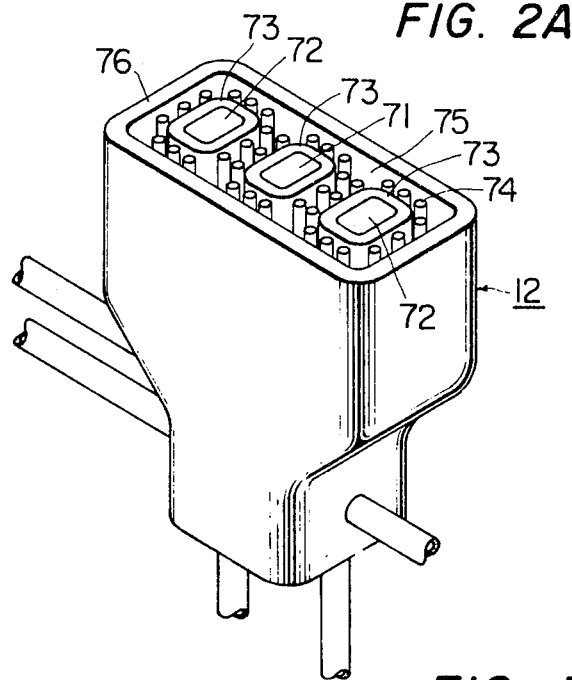
FIG. 2A is a perspective view showing one example of an oxy-hydrogen burner having glass raw material spraying nozzles.

FIG. 2A illustrates one example of a concrete structure of the burner 12, which is designed such that a raw material which will ultimately form glass of high refractive index is emitted from the nozzle 71 and that a raw material which will ultimately form glass of low refractive index is emitted from the nozzles 72 disposed on the opposite sides of the nozzle 71. The open ends of the nozzles 71 and 72 are respectively surrounded by narrow nozzles 73, from which an inert gas is blown out, thereby to prevent that oxy-hydrogen flames and the raw materials mix and react to each other in the vicinity of the open ends of the nozzles to deposit glass on the open ends to cover them. Oxygen is uniformly emitted from a plurality of nozzles 74 as thin as, for example, about 0.5 mm and provided in the neighborhood of the raw material nozzles, that is, around the nozzles 73. Hydrogen gas is emitted uniformly around the nozzles 74 from a nozzle 75 having disposed therein the nozzles 74 as a whole. Further, a nozzle 76, which also has a small width, is provided on the outside of the nozzle 75, and emits an inert gas to prevent the oxy-hydrogen flames from spreading out. The outermost inert gas prevents dispersion of the resulting glass fine particles to provide for enhanced deposition efficiency of them on the starting member 13. The burner 12 is disposed with the center of the nozzle 71 aligned with the center of rotation of the starting member 13.

Figure 2B:
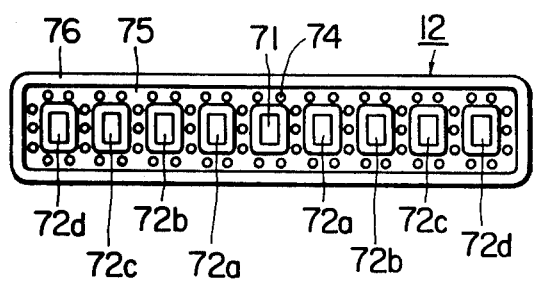
FIG. 2B is a plane view showing another example of the burner.

An accurate control of the refractive index distribution can be achieved by using many nozzles to control the mixing ratio of the raw materials emitted from the respective nozzles so that the refractive index may gradually vary. FIG. 2B shows such nozzle holes. On the outside of the nozzle 71 for forming the core of the resulting preform, there are disposed pairs of nozzles 72a to 72d for forming the cladding. That is, the nozzles 72a are disposed on both sides of the nozzle 71, the nozzles 72b outside of the nozzles 72a, the nozzles 72c outside of the nozzles 72b, and the nozzles 72d outside of the nozzles 72c. The nozzles 72a to 72d outside of the nozzle 71 spray raw materials which produce a glass rod whose refractive index will decrease gradually from the center in the radial direction. Each pair of nozzles 72a to 72d, which are symmetrical with respect to the nozzle 71, blow out the raw material of the same composition.

Figure 2C:
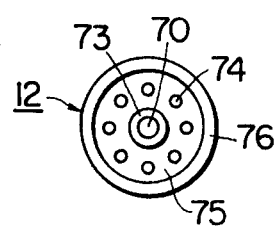
FIG. 2C is a plane view illustrating the simplest form of the oxy-hydrogen burner having glass raw material spraying nozzles.

Conversely, the simplest form of the burner 12 is such as shown in FIG. 2C, which has only one raw material emitting nozzle 70. Two such burners 12 are disposed side by side in parallel to the axis of rotation of the starting member 13, and a raw material which will form high refractive index glass is emitted from one of the burners towards the center of the end face of the rotating starting member 13 and a raw material which will produce low refractive index glass is emitted from the other burner towards the peripheral portion of the end face of the starting member 13, thus providing a porous preform. In this case, by adjusting the relative positions of the two burners to each other, a step or graded index type fiber preform can be obtained at will. That is, where the two burners are disposed so close to each other that streams of glass fine particles get mixed with each other, the graded index type fiber preform is produced. Where the burners are spaced apart from each other so that the streams of glass fine particles emitted therefrom do not get mixed, the step index type preform is obtained.

The oxy-hydrogen burner, used for synthesizing the glass fine particles, may be replaced with an RF plasma torch, DC plasma torch, or the like. In the case of the oxy-hydrogen burner, an oxide is formed by the hydrolysis reaction of water resulting from combustion and glass raw materials such as silicon tetrachloride, etc., so that one portion of the water creeps into the preform to cause absorption loss. As contrasted with this, the plasma torch described hereinunder produces a high temperature oxygen gas and causes it to perform an oxidizing reaction directly with the glass raw material such as silicon tetrachloride, so that no water content remains in glass ensuring to obtain a glass preform of little absorption loss.

Figure 3:
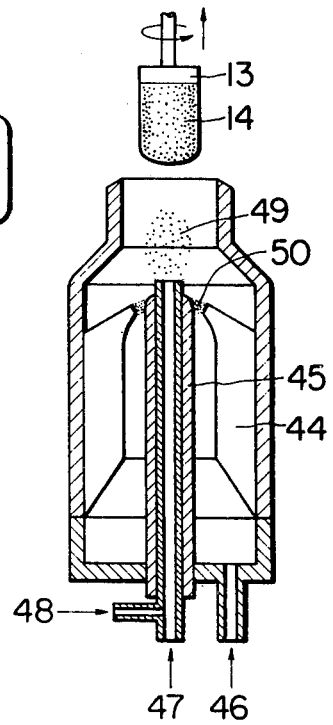
FIG. 3 is a sectional diagram showing one example of a plasma torch having glass raw material spraying nozzles.

FIG. 3 illustrates in section one example of the DC plasma torch. An inert gas such as argon is supplied through a pipe 46 into the torch between cylindrical high purity carbon 44 and 45 disposed coaxially with each other, a direct current of 50 V and 100 A is applied between electrodes on the tops of the carbons 44 and 45 to cause an arc discharge 50, heating the argon gas up to 1400° C. On the other hand, an oxygen gas is supplied into the inner electrode 45 from a pipe 47, along with a glass raw material supplied from a pipe 48 connecting with the pipe 47, and the oxygen gas and the glass raw material are mixed with the high temperature argon gas in a space 49 above the electrode to cause an oxidizing reaction, producing glass fine particles. If the temperature is above 1200° C after mixing the high temperature argon, oxygen and raw material gases, highly efficient reaction occurs. The torch shown in FIG. 3 corresponds to the burner of FIG. 2C, so that a torch for the core and a torch or torches for the cladding must be provided.

The RF plasma torch is described in detail in U.S. Pat. No. 3,275,408 to John Alexander. Also with the RF plasma torch, glass fine particles can be similarly produced. Accordingly, glass fine particles can be obtained by mixing high temperature oxygen and glass raw material regardless of the construction of the heater used.

Further, where ozone ($O_3$) is mixed in oxygen in an amount of 0.5 to 10% with respect to the latter, the oxidizing reaction can be caused at lower temperatures and, in this case, a sufficient reaction takes place at 250° to 300° C.

The porous preform 14 should be made of glass having an absorption characteristic of the least light absorption, and such glass is desirable for which high purity raw materials are easily available. In concrete terms, silicon tetrachloride ($SiCl_4$), silane ($SiH_4$), organic silicon ($SiCl_3CH_3$, $SiCl_2(CH_3)_2$, $Si(CH_3)_4$, etc. are desirable and, from the viewpoint of extremely reducing water content, $SiCl_4$ or the like which does not contain hydrogen, is preferred. These materials will ultimately become $SiO_2$. As the raw material for controlling the refractive index and thermal expansion coefficient, $GeCl_4$, $BCl_3$, $BBr_3$, $PCl_3$ and $POCl_3$ are desirable, and one or more of them are used and ultimately form $GeO_2$, $B_2O_3$, $B_2O_3$, $P_2O_5$ and $P_2O_5$, respectively. In the present invention, however, the raw material need not always be limited specifically to the abovesaid ones but may also be oxides such as aluminum oxide, gallium oxide, titanium oxide or the like etc., or an organic compound.

Generally speaking, where a kind of dopant such as $GeO_2$ is added for raising the refractive index of the core of the preform, the thermal expansion coefficient of the core increases to cause cracking. To avoid this, it is desirable to maintain a uniform thermal expansion coefficient in the radial direction of the preform by adding to the peripheral area of the preform a dopant which increases only the thermal expansion without causing abrupt refractive index increase or decrease by the addition of $B_2O_3$ or the like.

Figure 4:
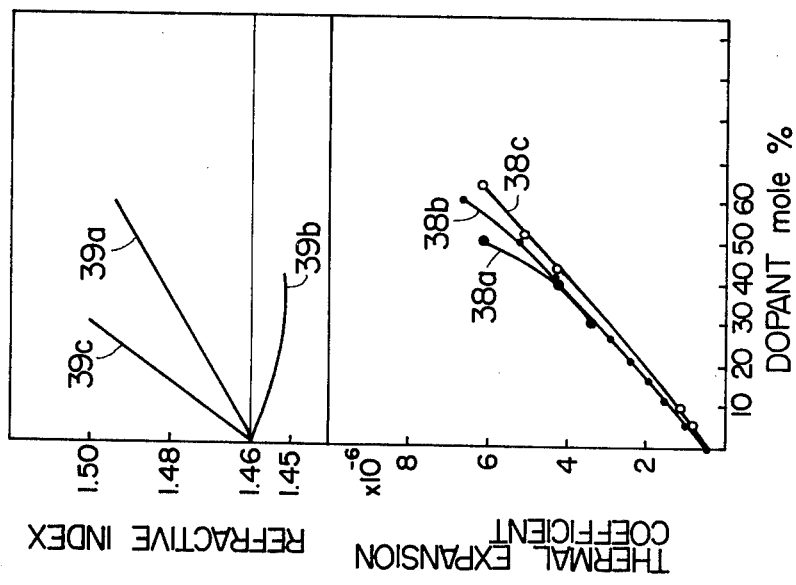
FIG. 4 is a graph showing the variation characteristics of the thermal expansion and refractive index of glass with respect to the dopant concentration.

FIG. 4 shows the relationships of the refractive index and thermal expansion coefficient to the amounts of oxides added. The curves 38a, 38b, 38c show the relation characteristics of the thermal expansion coefficient with respect to the amounts of $P_2O_5$, $B_2O_3$ and $GeO_2$, respectively; and the curves 39a, 39b and 39c the relation of the refractive index with respect to the amounts of $P_2O_5$, $B_2O_3$ and $GeO_2$, respectively. For example, in the case where 10 mol% of $GeO_2$ is added to the core portion of the glass preform, there is a refractive index difference of 0.01 between the core portion and pure quartz glass forming the cladding portion, and the thermal expansion coefficient becomes as large as $1 \times 10^{-6}$. Accordingly, the use of pure quartz for the cladding provides a large thermal expansion coefficient difference between the core and the cladding, and cracking is likely to occur in the preform. Then, in order to make the thermal expansion coefficient of the cladding substantially equal to that of the core, it is desirable to add $B_2O_3$ or the like which causes less refractive index increase or decrease when added. Where $B_2O_3$ is added to the core, its thermal expansion coefficient becomes substantially equal to that of the cladding, and the refractive index becomes smaller than the pure quartz only by 0.003 or so. This does not greatly interfere with determination of the construction of the optical fiber, and an optical fiber preform which is also mechanically strong can be obtained.

EXAMPLE 1

The raw materials and combustible gases shown in the following Table 1 were fed to the burner of FIG. 2A to synthesize glass fine particles.

Table 1

| Nozzle | Raw Material | Temperature of Vessel (° C) | Gas | Flow Rate (cc/min.) |
|---|---|---|---|---|
| 71 | $SiCl_4$ | 23 | $H_2$ | 200 |
|  | $GeCl_4$ | 10 | $H_2$ | 200 |
|  | $BBr_3$ | 5 | $H_2$ | 100 |
| 72 | $SiCl_4$ | 23 | $H_2$ | 200 |
|  | $GeCl_4$ | 2 | $H_2$ | 120 |
|  | $BBr_3$ | 15 | $H_2$ | 200 |
| 73 |  |  | Ar | 250 |
| 74 |  |  | $O_2$ | 260 |
| 75 |  |  | $H_2$ | 4000 |
| 76 |  |  | Ar | 2000 |

Where the raw materials were blown into the flames of the oxy-hydrogen gas supplied to the burner, spherical glass fine particles about 500 to 1000 Å in diameter were obtained. The stream of the glass fine particles was directed to the lower end face of a quartz glass rod 15 mm in diameter which was used as the starting member. The quartz glass rod was revolved at a revolving speed of 150 to 60 rpm, and moved up at a speed of about 1 mm per minute. The burner 12 was disposed with its center, i.e. the center of the nozzle, aligned with the center of the quartz glass rod. As a result of this, a porous preform 40 mm in diameter was produced at a speed of 6 cm per hour. Further, the porous preform was successively supplied into the high temperature furnace 60 for vitrification, by which an optical fiber preform 20 mm in diameter was obtained. The speed of fabrication of the optical fiber preform was 15 gr. per hour.

Figure 5:
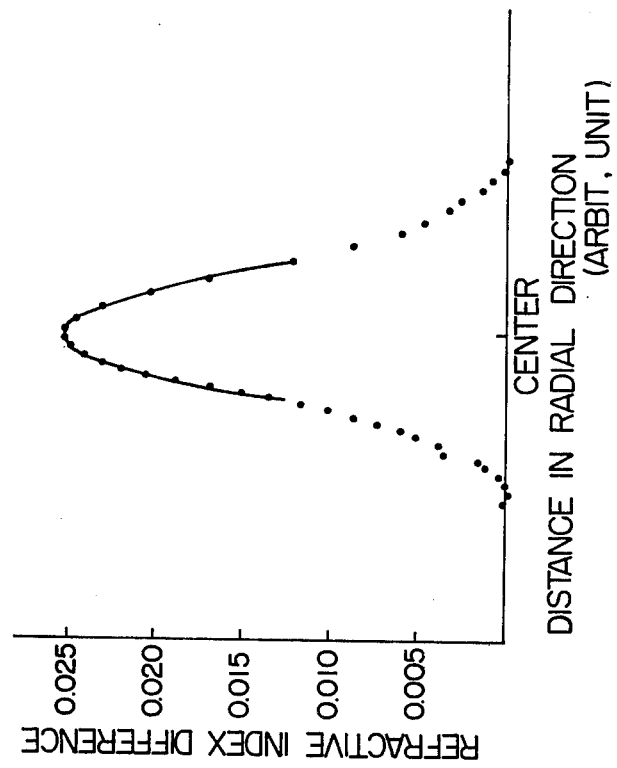
FIG. 5 is a graph showing the refractive index profile in the direction of diameter of an optical fiber preform produced according to this invention.

The central part of the refractive index profile of the optical fiber preform thus produced was matched fairly well to a parabolic curve, (the solid curve) as plotted in FIG. 5, and the refractive index profile of the peripheral portion was somewhat deviated from the parabolic curve, as shown. The optical baseband frequency characteristics of the optical fiber preform went down by 6 dB at 500 MHz, which was relatively excellent. The transmission loss spectrum of the optical fiber preform was about 5 dB/km in the region of 0.8 to 1.1 $\mu$, as shown in FIG. 6. In this region, there was a portion in which the loss further increased about 5 dB/km at 0.95 $\mu$. This is because of absorption by the water content in glass, as is well-known in the art, and it is assumed from the value of absorption that water was contained in the amount of about 5 ppm. These values are substantially equal to those of optical fiber preforms produced by conventional manufacturing methods. That is, an optical fiber preform whose characteristics were by no means inferior to those of the conventional optical fiber preforms was obtained.

FIG. 7 illustrates another example of the optical fiber preform manufacturing method of this invention. The gas-tight vessel 1 is composed of upper and lower parts 1a and 1b, each of which is, for instance, a cylindrical gas-tight vessel of glass, as in the case of FIG. 1. The lower open end of the lower gas-tight vessel 1a is covered, for example, with a stainless steel plate 54 coated with anti-corrosive paint which is resistant to hydrochloric acid, chlorine, etc., such, for example, as Teflon.

A burner 12a, which has a nozzle for the formation of the core, is inserted and held in a centrally disposed hole of the bottom plate 54. The burner 12a has no nozzles for the formation of the cladding, and a burner 12b having nozzles for the cladding is inserted and held in a hole formed in the side wall of of the upper gas-tight vessel 1b. In the illustrated example, each of the burners 12a and 12b is the plasma torch shown in FIG. 3. Argon gas is fed to the burner 12a at a flow rate of 200 cc/min., heated up to 1400° C and mixed with oxygen gas fed at a flow rate of 100 cc/min. to produce a high temperature oxygen gas of 1200° C. A glass raw material for the formation of the core is blown into the oxygen gas to form glass fine particles. The glass fine particles thus formed are deposited on the lower end face of the starting member 13 to grow a porous glass rod 14a for the core. The burner 12b for the formation of the cladding is identical with the burner 12a except that a glass raw material for the formation of the cladding is supplied to the burner 12b. The glass fine particles obtained from the burner 12b are deposited on the peripheral surface of the porous glass rod 14a to form thereon a porous glass layer 14b for the cladding. Diametrically opposite to the burner 12b for the cladding, an exhaust tube 55 is inserted and held in a hole of the upper gas-tight vessel 1b. The exhaust tube 55 exhausts the gas from the gas-tight vessel 1b to ensure efficient deposition of the glass fine particles from the burner 12b on the porous glass rod 14a. In this case, diffusion plates 56, each having a lot of perforations uniformly distributed therein, are provided in the exhaust tube 55 to exhaust at a uniform flow rate. Under a partition plate 57 separating the upper and lower gas-tight vessels 1b and 1a from each other, a cutting tool 58 is disposed in contact with the peripheral surface of the porous glass rod 14a, by which its diameter can be made constant with the rotation of the glass rod 14a. By evacuating the air from the gas-tight vessel 1a through exhaust pipes 59 provided in the gas-tight vessel 1a between the cutting tool 58 and the partition plate 57, cutting chips by the cutting tool 58 are also carried out of the vessel 1a. The gas-tight vessel 1a is identical with that of FIG. 1 except the abovesaid matters, but the matters which have not been explained previously in connection with FIG. 1 will be described in brief. In the high temperature furnace 60, carbon wool 67 used as a thermal insulating material is interposed between the heater 61 and the outer metallic container. On the top of the high temperature furnace 60 is provided a hollow, cylindrical member 68 of hard glass, on the top of which is provided a seal 69 through which the resulting optical fiber preform is moved out. In FIG. 7, the supply of the glass raw materials to the nozzle for the core and the nozzles for the cladding can be achieved in the same manner as in the case of FIG. 1.

EXAMPLE 2

The apparatus shown in FIG. 7 was used and the glass raw materials were supplied under the conditions shown in the following Table 2:

Table 2

| Raw Material | Vessel Temperature (° C) | Nozzle for Core (cc/min.) | Nozzles for Cladding (cc/min.) |
|---|---|---|---|
| $SiCl_4$ | 58 | 750 | 750 |
| $GeCl_4$ | 85 | 80 | 0 |
| $BCl_3$ | 13 | 0 | 80 |
| $PCl_3$ | 76 | 20 | 20 |

A porous glass rod 40 mm in diameter could be obtained for the formation of the core, and the porous glass layer 14b for the formation of the claddng was 8 mm. The drawing speed of the starting member 13 was 20 cm per hour and about 240 gr. of optical fiber preform could be obtained per hour. The raw material containers were respectively held at the temperatures shown in The Table 2 so that the vapor pressures of the raw materials were about 1 atmosphere.

Where the porous glass rod 14 is moved at a constant speed, temperature variations in the burner 12 and slight variations in the amount of each glass raw material supplied introduce dispersion in the outer diameter of the porous preform 14 and in the refractive index of the resulting optical fiber preform. This causes a transmission loss and deteriorated frequency characteristic of the ultimate optical fiber made of the optical fiber preform. From this point of view, it is desirable to hold the growing end face of the porous preform 14 at a constant position. For example, as illustrated in FIG. 8, one portion of light emitted from a hellium laser 81 is divided by a semitransparent mirror 82 into two, one of which is received by a photodiode 83, and the intensity of light is picked up as a signal A. The other light beam is magnified by a lens system 84 into a beam 85 about 5 to 20 mm in diameter. The magnified beam 85 irradiates the neighborhood of the growing end 14d of the porous preform 14 from a direction substantially at right angles to the axis of the porous preform 14 so that one portion of the beam 85 may impinge upon the porous preform 14. The other portion of the beam which is not intercepted by the porous preform 14 is focused by a lens 86 and only laser light is picked up through an interference filter 87, and converted by a light detector 88 such as a solar battery, PIN diode or the like into a signal B. The signal B thus obtained is divided by the signal A from the photodiode 83 in a divider circuit 89. The divided output signal C derived from the divider circuit 89 corresponds to the degree to which the laser beam 85 is intercepted by the porous glass rod 14. Thus, the position of the growing end face of the porous preform 14 is detected. The drive voltage for the motor 3 in FIG. 1, which is provided for drawing the porous preform, is regulated by a control circuit 92 in such a manner that the difference between the signal C and a reference signal derived at a terminal 91 may remain constant. By the drive voltage from the control circuit 92, the motor 3 is driven to control the moving speed of the porous preform 14, by which the position of the growing end face 14d of the porous preform 14 is held constant relative to the burner 12.

The optical fiber preform fabricated by the method of this invention is different from preforms produced by the methods of R. D. Maurer (U.S. Pat. No. 3,737,293) and L. L. Carpenter (U.S. Pat. No. 3,823,995) as follows:— With the conventional methods, glass is deposited in the radial direction with respect to the axis of the optical fiber preform, as described previously, so that small refractive index fluctuations appear in the radial direction just like annual rings. Such a structure is set forth in detail in the Bell System Technical Journal Dec. 1975, pp. 1681–1692, H. M. Presby, R. D. Standley, J. B. Machesuey and P. B. O'Corner, "Material Structure of Germanium-Doped Optical Fibers and Preforms".

On the other hand, in the method of this invention, since the glass fine particles are deposited in the axial direction of the porous preform, the resulting optical fiber preform is free from the annual-ring-shaped refractive index fluctuations, and has an extremely uniform refractive index in the radial direction. In the axial direction of the optical fiber preform, slight refractive index variations are introduced by fluctuations in the stream of the glass fine particles during deposition but the refractive index variations are less than 0.0005, so that the core of the optical fiber preform in its axial direction is homogeneous as compared with those obtainable with the conventional method.

FIGS. 9A and 9B show interference fringes obtained by measuring, with an interference microscope, refractive index fluctuations of the optical fiber preform of this invention in its axial and radial directions, respectively. In FIG. 9A, refractive index fluctuations smaller than 0.0001 are seen but, in FIG. 9B, no refractive index fluctuations are seen.

Further, in the conventional methods, the starting member, about which the optical fiber preform is formed, is removed and then the preform is molten to collapse the central hollow portion to solid cross-sectional area but, in this process, dopants such as $GeO_2$ and so on evaporate to form a dip in the refractive index of the central portion of the preform. This dip is the cause of an increase in the transmission loss and the degradation of the frequency characteristic. However, the optical fiber preform produced by the method of this invention does not require the step of removing such starting member, and is formed compact to the core center from the beginning, so that no dip is introduced in the refractive index.

As has been described in the foregoing, the manufacturing method of this invention enables easy fabrication of a thick and long optical fiber preform. With the conventional inside deposition method, only 2–10 gr. of preform can be obtained per hour. With the method of this invention, however, the optical fiber preform can be produced as much as 240 gr. per hour. In the method of this invention, the time from the start of the manufacture to the porous glass deposition step is substantially the same as in the prior art outside deposition method, but the conventional method requires a very long time for the removal of the starting member and involves the step of filling up the resulting hollow portion. Accordingly, this conventional method is time-consuming and troublesome. With this invention, however, immediately after the porous preform is deposited on the starting member, it is continuously vitrified to provide an optical fiber preform.

It will be apparent that many modifications and variations may be effected without departing from the scope of the novel concepts.

What is claimed is:

1. A continuous optical fiber preform fabrication method, comprising the steps of:
    preparing a refractory starting member;
    moving said starting member along its axis of rotation while rotating it by rotating and moving means;
    blowing a glass raw material for the formation of the core from a nozzle for the core into a high temperature portion near the tip of a high temperature burner for the reaction of said glass raw material to deposit glass fine particles consisting principally of silicon dioxide, resulting from the reaction, on one end face of said starting member to form thereon a columnar porous glass core about said axis of rotation of the starting member;
    blowing a glass raw material for the formation of the cladding from at least one nozzle for the cladding into a high temperature portion near the tip of a high temperature burner for the reaction of said glass raw material to deposit glass fine particles consisting principally of silicon dioxide, resulting from the reaction, on the peripheral surface of said porous glass core to form thereon a porous glass layer for the cladding to provide a porous preform, said porous glass layer having a refractive index lower than said porous glass core; and
    continuously feeding said porous preform into a high temperature furnace provided on said axis of rotation of the starting member for vitrifying said porous preform into an optical fiber preform.

2. The method according to claim 1, wherein said at least one nozzle for the cladding is disposed opposite to said one end face of the starting member but a little deviated from said axis of rotation to deposit the glass fine particles on said one end face of the starting member at the same time as the glass fine particles from said nozzle for the core, forming a porous glass layer on the peripheral surface of said porous glass core.

3. The method according to claim 2, wherein said nozzle for the core and said at least one nozzle for the cladding are disposed to partially intermix the glass fine particles from both of said nozzles to obtain a graded index type optical fiber preform that the refractive index profile in its cross-section is substantially a square curve.

4. The method according to claim 2, wherein at least one pair of nozzles for the formation of the cladding are disposed symmetrically with respect to said axis of rotation of the starting member, each pair of nozzles symmetrical with respect to said axis of rotation blowing off glass raw materials of the same components.

5. The method according to claim 2, said nozzle for the core and said nozzle for the cladding are respectively incorporated in different high temperature burners.

6. The method according to claim 2, wherein said nozzle for the cladding are all incorporated in one high temperature burner.

7. The method according to claim 1, wherein at least one nozzle for the cladding is provided further to the side of the high temperature furnace than said nozzle for the core, and wherein glass fine particles from said at least one nozzle for the cladding are deposited on the peripheral surface of said porous glass core from a lateral direction, to form thereon a porous glass layer for the cladding.

8. The method according to claim 7, wherein a plurality of nozzles for the cladding are arranged along said axis of rotation for blowing off glass raw materials selected so that the refractive indexes of the resulting glass decrease gradually as said high temperature furnace is approached.

9. The method according to claim 7, wherein a cutting blade is contacted with the peripheral surface of said porous glass core before said porous glass core reaches the position of deposition of said porous glass layer, thereby maintaining the diameter of said porous preform at a constant value.

10. The method according to claim 1, wherein at least one nozzle for the cladding is disposed opposite to said starting material but a little deviated from said axis of rotation to deposit glass fine particles from said at least one nozzle on said one end face of the starting member in its axial direction to form a porous glass layer on the peripheral surface of said porous glass core at the same time as the formation thereof, and wherein at least one more nozzle for the cladding is provided further to the side of said high temperature furnace than said nozzle to blow a glass raw material for the formation of glass of smaller refractive index than that of the glass raw material supplied to said nozzle for the cladding, glass fine particles obtained from said at least one more nozzle for the cladding being deposited on the peripheral surface of said porous glass layer for the cladding to form thereon an outer porous glass layer.

11. The method according to claim 1, wherein an inert gas is emitted in layers along said axis of rotation from the marginal edge of said high temperature burner to prevent diffusion of the glass fine particles.

12. The method according to claim 1, wherein the position of the growing end face of said porous preform in the axial direction of said starting material is detected to control the moving speed of said starting member to hold the diameter of said porous preform constant.

13. The method according to claim 1, wherein said high temperature burner is a burner for use with oxygen and hydrogen or other combustible gas, and hydrolyzes the glass raw materials by flames to produce glass fine particles.

14. The method according to claim 1, said high temperature burner is a plasma torch, and wherein a high temperature oxygen gas produced by said burner and glass raw materials containing no hydrogen are caused to react with each other to produce glass fine particles.

* * * * *